United States Patent Office 2,715,945
Patented Aug. 23, 1955

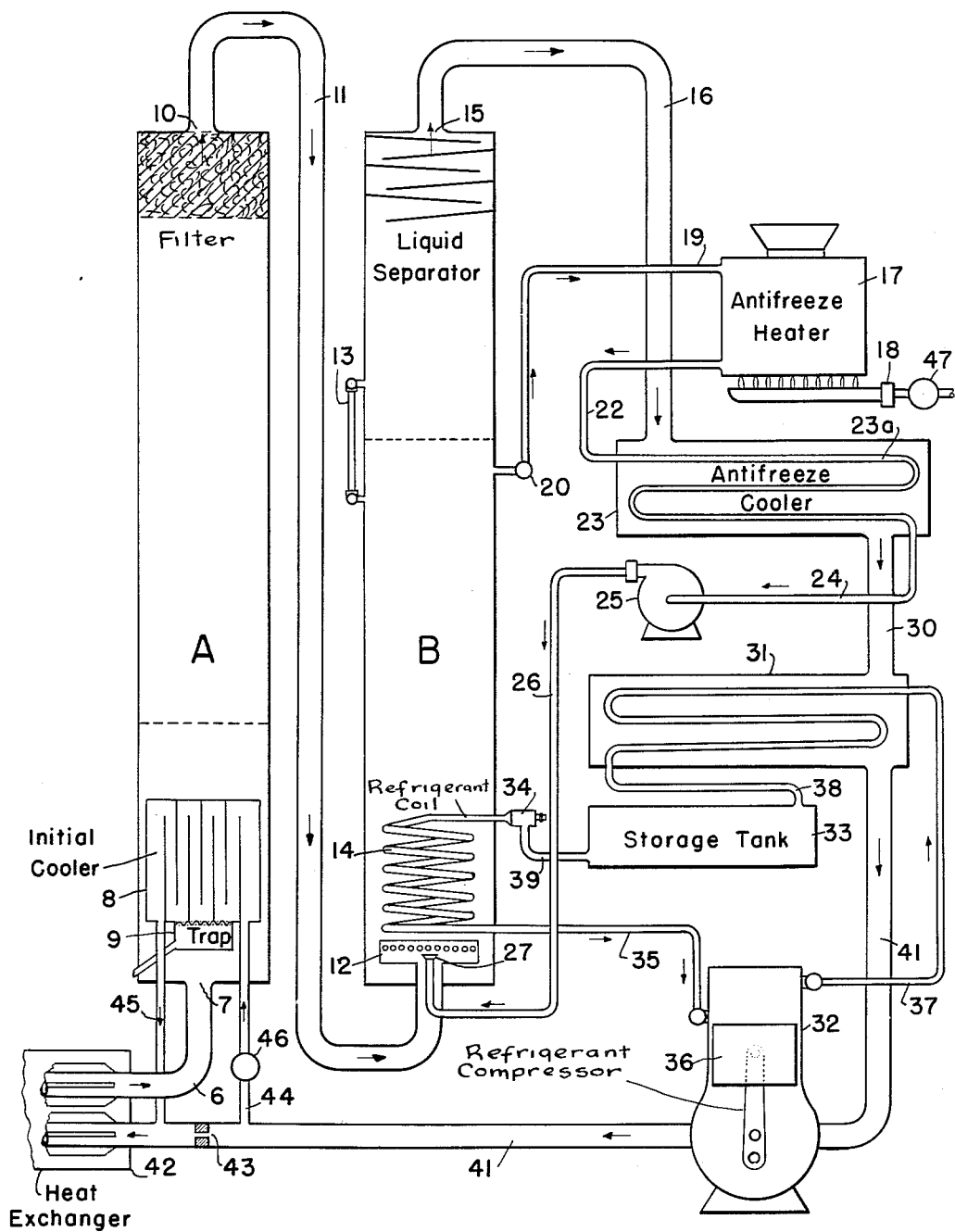

2,715,945

METHOD AND APPARATUS FOR REMOVING FOREIGN MATERIALS FROM GASEOUS FLUIDS

Paul M. Hankison, Bridgeville, and Donald K. Bice, Pittsburgh, Pa.

Application February 27, 1952, Serial No. 273,748

8 Claims. (Cl. 183—32)

This invention relates to procedure and apparatus for removing foreign material from air and other noncondensable fluids and has an object to produce improved procedure and apparatus for accomplishing such a removal.

A further object of the invention is to produce improved procedure and apparatus for removing substantially all moisture and other foreign material from a noncondensable fluid such, for example, as air and particularly from compressed air or other fluid which has been compressed. The term "noncondensable fluid" is employed to mean a fluid such as air which is not readily condensable except at an extremely low temperature or under high pressure and low temperature.

These and other objects are attained by means of a method or procedure such as is herein set forth and defined, and also by means of apparatus such as is diagrammatically illustrated in the drawings accompanying and forming a part hereof.

The drawings diagrammatically illustrate apparatus, which may be employed in carrying forward some or all of the procedural steps herein set forth and defined as embodying one aspect of our invention. The other aspect of our invention involves the apparatus for carrying forward the procedure herein set forth, i. e., a system made up of cooperating pieces of apparatus which function to clean air and other gaseous fluid by removing therefrom foreign particles and also contaminating condensable vapors such as water vapor, oil vapor, etc. Throughout the further description of the invention we have used the term "fluid" to mean air or other noncondensable gaseous medium, independently of the extent of pressure applied thereto. We have also used the term "vapor" to mean a condensable fluid such, for example, as water vapor, and we have used various forms of the term "dehydrate" as applied to fluid to mean that condensable vapors have been substantially completely removed from the fluid.

From the standpoint of procedure, our invention broadly consists in creating a flow of a noncondensable gaseous fluid, such as air, and subjecting the moving fluid to a substantial reduction in temperature and simultaneously removing therefrom condensate such as water, as results from the condensation of vapors included in or entrained by the fluid. Our invention also involves removal from the fluid of such foreign particles as may be carried by it. The particle removal step may be accomplished either before or after the temperature reduction of the fluid.

More specifically stated, the procedure constituting an aspect of our invention involves compressing air or fluid to a pressure above atmospheric, for example, to a pressure at which the fluid is to be employed in connection with some commercial or manufacturing operation. The pressure, however, may be just enough to cause the fluid to flow through the processing apparatus employed. The fluid so compressed is then caused to move in a substantially continuous stream-like flow through various pieces of apparatus in which it is preliminarily cooled to a temperature slightly above the freezing point of the predominant condensable vapor mixed therewith. During this cooling the dew point of the fluid is materially reduced and the resulting condensate is preferably collected within and then discharged from the apparatus in which the cooling is accomplished.

The moving stream of fluid is then filtered, i. e., caused to pass through a filtering substance for the purpose of removing therefrom foreign particles, such as minute particles of dirt, dust or liquid as may be carried by it. The initially cooled and filtered fluid is then further reduced in temperature, i. e., reduced to a temperature which is preferably below the freezing point of such contaminating vapors as may remain in it. Where moisture, i. e., water vapor, is the principal contaminant the temperature of the fluid is reduced below, and preferably materially below 32° F.

In the illustrated embodiment of the invention, the partially cleaned fluid is subjected to the second refrigeration by being delivered to a freezing chamber which contains what may be termed an antifreeze mixture maintained at a low temperature. The term "antifreeze mixture" is used in its popular sense to define a liquid which does not freeze at low temperatures such as are likely to be encountered during the winter season. This mixture may be any one of the various antifreeze liquids now in commercial use, which has a freezing temperature substantially below 0° F. and a boiling point above 212° F. As the fluid moves into the freezing chamber it is intimately mixed with the antifreeze mixture, for example, by being caused to bubble therethrough, where a substantial quantity of the mixture is located in the bottom portion of the freezing chamber. After bubbling through the mixture the fluid is collected above the surface thereof in a slowly moving stream from which entrained liquid particles may be separated. The separated liquid may be drained back into the antifreeze mixture within the chamber.

The antifreeze mixture is also such that water or other condensate resulting from the substantial reduction in temperature within the freezing chamber, will be readily absorbed by or be retained in suspension in the antifreeze liquid. In this way substantially all foreign material is removed from the moving stream of fluid.

The fluid so cleaned and so refrigerated can then be employed in absorbing heat from incoming fluid, i. e., fluid to be cleaned. It can also be employed in absorbing at least some of the heat developed in the operation of refrigerating the antifreeze mixture and in absorbing some of the heat delivered to that mixture during the operation of removing therefrom such condensate or condensates as are collected by it in the freezing chamber. As to this it is noted that the low temperature antifreeze mixture within the freezing chamber, retains the condensate resulting from the condensation of vapors carried by the fluid as it enters the freezing chamber and such condensed vapors are intimately mixed with the antifreeze mixture. It may be that the absorption of such vapors by the antifreezing mixture, takes place as or after the condensation thereof is accomplished by the low temperature but the compressed fluid leaving the freezing chamber is, from a practical standpoint, free of condensable vapors and other foreign substances.

It is desirable to limit or minimize the contamination of the antifreeze mixture occasioned by the condensed vapors absorbed or taken up by it. For this reason mixture is withdrawn from the freezing chamber and processed in order to remove the contaminating condensates from it. In accomplishing this, the antifreeze mixture is either continuously or periodically withdrawn from the freezing chamber and heated to a temperature substantially below the boiling point thereof, but to a temperature sufficiently high to remove or distill off the condensable vapors absorbed or carried by it. If, for example, the predominate contaminant of the antifreeze liquid is water resulting from the condensation of moisture carried by the noncondensable fluid, the antifreeze mixture so withdrawn is heated to a temperature substantially above 212° F. but nevertheless well below a temperature which will occasion boiling or even rapid evaporation of the antifreeze liquid. In this way the absorbed vapors are removed from the antifreeze liquid and, after cooling, the liquid is again returned to the freezing chamber, is again refrigerated and mixed with the low temperature liquid within that chamber. However, the heated antifreeze mixture is preferably cooled by the processed or cleaned fluid before it (the liquid) is returned to the freezing chamber.

This initial cooling may be accomplished by passing the heated antifreeze mixture through piping as it moves back to the low temperature container, and by subjecting the piping to the flow of the refrigerated and cleaned fluid. The refrigerated fluid can also be employed in the operation of initially cooling incoming fluid, i. e., fluid entering the processing apparatus. The initial cooling of the incoming fluid may be accomplished by passing all or only a portion of the refrigerated fluid through cooling coils over which the incoming fluid is caused to pass during its initial cooling. In any event, the cycle of the operation employed in cleaning the compressed air or other fluid preferably involves employing the heat absorbing capacity of the refrigerated and cleaned fluid in removing heat from fluid to be cleaned, entering the processing apparatus, and also in removing such heat as may be developed during the operation of refrigerating the fluid.

It should also be borne in mind throughout the further description of the invention that the filtering procedure herein commented upon may be resorted to either before or after the initial cooling of the fluid. As noted, it is desirable and, in fact, essential to remove all foreign particles from the fluid and a filtering or washing operation must be employed. If a gas washing operation is resorted to in place of or in addition to dry filtering, it should take place prior to the initial cooling of the fluid.

Referring to the drawings, a combined cooling and filter tower or receptacle A receives fluid from a conduit 6 through an inlet port 7 formed in the bottom of the receptacle. The fluid entering the receptacle A is almost immediately subjected to the heat removing effect of an initial cooler 8 of any desired form but so arranged that substantially the entire volume of fluid entering the receptacle A passes over and in close proximity with the cooling elements thereof. As previously noted, the initial cooler is such that while the temperature of the incoming fluid is maintained above the freezing point of such vapors as are carried by it, the dew point of such fluid is so reduced within the receptacle A that a substantial quantity of the condensable vapors carried by it is condensed within the cooler 8, or at least within the receptacle A. Where water vapor is usually the principal contaminating vapor in the fluid, the temperature in the chamber A is maintained a little above 32° F.

In the drawings we have shown the cooler 8 as provided with a trap 9 for collecting and discharging water or other condensate from the receptacle A. It will, of course, be apparent that a commercial trap, such as a float controlled trap, may be employed for this purpose and that the tray may be so located and arranged as to prevent water or other condensate from collecting in the bottom of the receptacle A.

The present embodiment of the invention, contemplates employing a filter such, for example, as the filter disclosed in L. E. Hankison Patent 2,355,373 of August 8, 1944, in association with the initial cooler 8. As indicated by the notation on the drawing, such a filter may be, and preferably is, located within the receptacle A and so arranged that the compressed fluid passes through it, after having been cooled, and as it moves toward the outlet port 10 of the receptacle A. The cleaned and partially dehydrated fluid leaving the port 10 is delivered by suitable passage or piping 11 to a second tower or receptacle B, which is adapted to be at least partially filled with an antifreeze mixture. The piping 11 communicates with a manifold 12 located in the bottom of the receptacle B and submerged by the body of antifreeze mixture contained in the receptacle.

The manifold is at times referred to as the bubbler and is provided with a series of fluid delivery apertures so arranged throughout its extent that the fluid entering it is delivered into the antifreeze liquid in the form of a mass of bubbles. The arrangement of the fluid delivery apertures is also such that the delivery of fluid to the antifreeze liquid is substantially uniform throughout the cross sectional extent of the receptacle B and the fluid, in moving upwardly to the surface of the liquid, is intimately intermingled with the liquid. The dotted line 13, associated with the diagrammatic illustration of the receptacle B, indicates a possible position of the top level of the antifreeze liquid in the receptacle B.

We have shown a refrigerating coil 14 within the receptacle B and located adjacent and above the bubbler 12 and submerged by the liquid in the receptacle. This coil receives refrigerant from refrigerating apparatus, hereinafter described, and it functions to maintain the liquid temperature within the receptacle B at or below the freezing temperature of the condensate resulting from the condensation of such vapors as may be contained in the fluid entering the receptacle B through the bubbler 12. Where the fluid is air and moisture and oil vapors constitute the condensable vapors carried by it, the antifreeze liquid may be refrigerated to a temperature substantially below 32° F. By passing the fluid through the lower portion of the receptacle B under conditions such that it is intimately intermingled with the low temperature antifreeze liquid contained therein, vapors contained in the fluid are condensed and are absorbed by, or retained in mechanical suspension in the antifreeze liquid.

As the fluid moves out of the liquid-containing portion of the receptacle B, it enters a liquid separator of any suitable type, as, for example, a separator in which overlapping baffle plates are so arranged as to cause fluid passing through the separator to move in a circuitous path in intimate contact with the baffles. The baffles are also preferably so arranged that liquid particles collected by them drain back into the body of liquid contained within the receptacle B.

It will be apparent that the liquid separator may be located in a separate container in open communication with the container in which the antifreeze liquid is located. It will also be apparent that the intimate mixture between the fluid and the antifreeze liquid may be attained in various ways although the present preferred procedure is such as to cause the fluid to pass into a mass of confined liquid and move upwardly therethrough in the form of a mass of separate bubbles.

After the fluid has passed through the liquid separator it is delivered through the port 15 to a passage or piping 16 and, as so delivered, is cleaned and dehydrated. As previously noted, we have employed the term "dehydrated" in an unusual sense, i. e., when used to define the fluid it means that the fluid is substantially free of moisture and other vapors.

The next step in the treatment of the compressed fluid involves raising its temperature for example to a temperature slightly above the freezing point of the contaminating vapors. In the present embodiment, this is accomplished under conditions such as to contribute to the refrigeration of the incoming fluid in the operation of cleaning and dehydrating it.

The final operation of dehydrating the compressed fluid contaminates the antifreeze mixture within the receptacle B and it is, therefore, desirable to treat the antifreeze mixture for the purpose of removing the contaminating condensates picked up by it as the compressed fluid, being processed, is intimately mixed with it in receptacle B.

Where the treatment of the compressed fluid is carried forward in a substantially continuous operation, it is desirable to so accomplish the treatment of the antifreeze mixture that the degree of contamination thereof will be maintained at a predetermined minimum throughout the entire operation. In order to do this we preferably continuously withdraw a small flow of antifreeze liquid from the receptacle B and deliver it to a liquid heater. It will, of course, be apparent that this delivery may be intermittent but we have found that a continuous withdrawal of liquid from the receptacle B better serves our purpose where the fluid cleaning operation is continuous. The processed antifreeze liquid is returned to the receptacle B after it has been partially refrigerated. In this way the contamination of the liquid within the receptacle B is maintained at a predetermined minimum.

The flow of antifreeze liquid is withdrawn from the receptacle B at a point near the level of the liquid, which is visible through a sight glass with which the receptacle is fitted. It will be apparent that in order to free the liquid so withdrawn, of contaminating condensates, it must be raised to a temperature above the boiling point of the condensates. It is, therefore, necessary to employ an antifreeze liquid which will not be frozen by, or otherwise detrimentally affected by the low temperatures encountered in the receptacle B and which will successfully withstand the high temperatures encountered during the distilling off of contaminating condensates absorbed by or mixed with the antifreeze liquid.

In the present embodiment the removal of contaminating liquids is accomplished in a liquid heater 17 which may be an open top vessel as shown, to which heat is applied by any suitable means such, for example, as a burner 18. Liquid is delivered from the receptacle B to the heater 17 through piping 19. The rate of withdrawal is controlled by a valve 20. The pressure existing within the receptacle B will force liquid through the piping and into the heater 17. The rate of flow of liquid to, through and from the heater is such that the heat delivered thereto raises its temperature high enough to insure the distilling off of the contaminating liquids carried by it. That is to say, baffles may be employed to cause the liquid to move in a circuitous path in passing through the open top heater 17 and in moving toward the discharge piping 22 communicating therewith.

As diagrammatically indicated, the piping 22 communicates with a cooling coil 23a located within and forming a part of a cooler 23. The cooler is in effect a heat interchanger in which heat is delivered from the hot antifreeze liquid to the refrigerated fluid leaving the receptacle B through piping 16. In the drawings the piping 16 is shown as communicating with the casing of the cooler 23 so that the refrigerated fluid is delivered to the interior of the casing and, in moving through the casing, surrounds the coil 23a traversed by the heated antifreeze liquid. The liquid moves through the coil in its passage back to the receptacle B. The discharge end of the coil 23a communicates with a passage or pipe 24 which is diagrammatically shown with its inlet end communicating with the coil 23a and with its other end communicating with the inlet port of a pump 25. The outlet port of the pump communicates with a passage or piping 26 which delivers the preliminarily cooled antifreeze mixture into the lower portion of the receptacle B.

For this purpose the piping 26 is diagrammatically shown as provided with a spray nozzle 27 at its delivery end. The nozzle 27 is located within the manifold or bubbler 12, and sprays the partially cooled antifreeze liquid into the fluid passing through the bubbler. In this way antifreeze liquid which has been processed to remove contaminating liquids therefrom, is returned to the receptacle B and the return conditions are such as to prevent moisture carried by the fluid from freezing and clogging up the delivery apertures of the bubbler. That is to say, a heat interchange may take place within the manifold 12 as between the incoming fluid from receptacle A and the partially cooled antifreeze mixture, but under the conditions involved, freezing of the contaminating vapors carried by the incoming fluid is at least to some extent prevented by mixing the fluid with the spray of antifreeze mixture from the nozzle 27. The mixing reduces the freezing point of the contaminating vapors entering the bubbler 12 with the fluid. Where the temperature of the antifreeze mixture, entering the receptacle B through the spray nozzle 27 is important, this can be controlled by varying the amount of heat interchange within the cooler 23 by either varying the extent of cooling surface exposed within the cooler, the amount of refrigerated fluid passing through the cooler or the rate of flow of that fluid in its passage through the cooler.

For the purpose of accomplishing a further heat interchange the fluid leaving the cooler 23 is delivered by a pipe or passage 30 to a condenser 31 which forms a part of refrigerating apparatus including a compressor 32, a refrigerant receiving tank 33 and an expansion valve 34. The expansion valve is so arranged that it delivers expanded and expanding refrigerant into the coil 14 located within the receptacle B.

The refrigerating apparatus may be of any suitable type. The inlet port of the compressor 32 is shown as communicating with the delivery end of the coil 14 through a refrigerant return pipe 35. As diagrammatically illustrated the compressor consists essentially of a cylinder in which a reciprocating piston 36 operates. The cylinder of the compressor is provided with the usual inlet and outlet ports and these ports are provided with the usual valves which control the delivery of the expanded refrigerant from the passage 35 into the compressor cylinder, and the delivery of the compressed refrigerant from the cylinder to a pipe or passage 37 which communicates with a condensing coil located within the condenser 31. The outlet end of the condenser coil communicates with a pipe 38 which delivers the compressed and condensed refrigerant to a storage tank 33 from which it is delivered to the expansion valve 34 through a pipe or passage 39.

From the foregoing it will be apparent that the refrigerated fluid leaving the receptacle B takes up heat from the heated antifreeze mixture leaving the heater 17 and from the compressed and, consequently, heated refrigerant entering and passing through the cooling coil of the condenser 31, and in this way, contributes to the refrigeration of the antifreeze liquid within the receptacle B. After passing through the condenser 31 the cleaned and dehydrated fluid is delivered by a pipe 41 to a heat interchanger 42 wherein an interchange of heat takes place between the air or other fluid entering the conduit or pipe 6 and the cleaned and dehydrated fluid moving through the pipe or passage 41. The type of heat interchanger employed for this purpose is optional but the intent is to obtain a preliminary cooling of the incoming fluid before it passes into the processing apparatus, viz., the receptacle A in which it is initially refrigerated by the cooler 8.

In addition we have shown a pressure reducing orifice located within the pipe 41 adjacent the inlet side of the interchanger 42. This reducing orifice is for the purpose of producing a pressure differential within the pipe 41 so that a portion of the refrigerated fluid traversing the pipe can be directed through the initial cooler 8 and employed as the cooling medium in that cooler.

As diagrammatically shown, the pipe 41 delivers cooling fluid to the cooler 8 through a pipe 44, which communicates with the pipe 41 on the high pressure side of the reducing orifice 43. The return pipe 45 from the cooling passages of cooler 8 communicates with the pipe 41 on the low pressure side of the orifice 43 and, as previously indicated, the arrangement is such that the cooling capacity of the cooler 8 is so proportioned, with relation to the rate of flow of incoming fluid from the passage 6, so as to materially reduce the temperature of that fluid, but at the same time hold it at a temperature slightly above 32° F., i. e., the freezing point of the moisture carried by the fluid.

Due to the fact that temperatures must be controlled in the initial cooler 8, and also in the antifreeze cooler 23, we have shown the pipe 44 provided with a control valve 46 and we have also shown the piping 19 provided with a control valve 20. The valve 46 may be thermostatically controlled or even manually controlled so as to vary the rate of flow of the refrigerated fluid leaving the pipe 41 and entering the cooler 8. In this way the rate of flow of the cooling medium to the initial cooler 8 may be so proportioned to the rate of flow of fluid entering the receptacle A from the pipe 6 that the temperature within the receptacle A may be closely controlled and maintained at the desired temperature, for example and as previously noted, a temperature slightly above the freezing point of water.

Likewise the valve 20 may be manually controlled or thermostatically controlled by the temperature of the antifreeze liquid leaving the heater 17, and the rate of heat input to the heater may also be controlled in any suitable manner, such for example, as by a valve 47 diagrammatically shown in connection with the representation of the heat input device, viz., the burner 18. In this way the temperature of the antifreeze leaving the cooler may be controlled, and all without varying the rate of flow of the fluid to be cleaned entering the receptacle A and of the cleaned and dehydrated fluid leaving the receptacle B.

It should be noted that, independently of the type of initial cooler employed, the cooler 8 is a heat exchanger and may be replaced by a heat exchanger such as the exchanger 42, in which the incoming fluid to be processed is cooled to a temperature slightly above the freezing point of the principal contaminating vapor mixed with the incoming fluid. The initially refrigerated fluid will then be delivered to a filter or directly to the freezing chamber B if, for example, it is filtered before initial refrigeration. As previously noted, where the predominating vapor in the incoming fluid is water vapor the fluid is initially reduced to a temperature approximating but a little above 32° F. and, independently of the initial temperature reduction, the condensate resulting therefrom is collected and removed from the path of flow of the incoming fluid.

Throughout the previous description of our invention we have referred to the fluid to be processed as a compressed fluid. While the preferred procedure contemplates initially compressing the fluid to be processed, it will be apparent that the fluid need not be initially compressed since a flow of fluid through the processing apparatus may be induced by a reduction of pressure at some point along the line of flow of the fluid. For example, the discharge end of the pipe 41 may communicate with a vacuum pump or exhauster and independently of whether or not all or only a part of the fluid traversing that pipe is employed in reducing the temperature of the incoming fluid. Under such conditions, the pressure reduction will manifest itself in the chambers A and B, with the result that a pump or similar means may be necessary for the purpose of withdrawing antifreeze mixture from the freezing chamber B and delivering it to the heater 17.

While we have described and diagrammatically illustrated apparatus capable of being employed in the cleaning and dehydrating system constituting the now preferred embodiment of our invention, it will be apparent that various changes, additions and substitutions as to apparatus may be made and also that various changes in, omissions from and additions to the procedural steps herein outlined may be made without departing from the spirit and scope of the present invention as defined by the appended claims.

The antifreeze mixture employed in carrying out our process may be any one of several which have characteristics previously referred to, i. e., a low freezing point, a relatively high boiling point and is hygroscopic. One such antifreeze liquid employed by us is ethylene glycol, but other dihydroxy alcohols and also ethylene and glycerol compounds may be employed. As a matter of fact any so-called "nonfreezing" liquid may be employed which will withstand freezing at the low temperatures employed in the final refrigeration of the fluid being processed and which is capable of taking up moisture from the fluid with which it is intimately mixed during the operation of dehydrating that fluid.

What we claim is:

1. A system for removing readily condensable vapor from a compressed gaseous fluid which includes a container for confining the flow of such fluid; means located within said container for cooling such fluid during its passage therethrough and for removing condensate from such container resulting from such cooling; a liquid-containing receptacle and means for delivering the fluid issuing from said container to said receptacle; means within said receptacle for refrigerating the liquid contained therein; a bubbler located within the container below the surface of the liquid within said container and below said liquid-cooling means, receiving the fluid issuing from said container; a liquid cooler; means for delivering fluid issuing from said receptacle to said cooler; means for withdrawing liquid from said receptacle during the passage of fluid through the liquid contained therein; means for heating liquid so withdrawn and for delivering the heated liquid to said cooler in heat interchange relationship with the fluid entering said cooler; a spray nozzle located within said bubbler for spraying liquid delivered thereto into the flow of fluid traversing said bubbler and entering said receptacle, and means for withdrawing liquid from said cooler and delivering it to said spray nozzle.

2. In a system for removing readily condensable vapors from a gaseous fluid existing at a pressure above atmospheric pressure; the combination of a receptacle containing a liquid refrigerant; a refrigerating coil located in said receptacle below the surface of the liquid content therein and in direct contact with such liquid; a bubbler located within said receptacle below the surface of the liquid contained therein and below said refrigerating coil for delivering fluid issuing therefrom in the form of bubbles into the liquid within said receptacle; means for delivering a flow of gaseous fluid to said bubbler; a liquid spray nozzle located in said bubbler for spraying liquid delivered thereto into the interior of said bubbler; means for withdrawing liquid from said receptacle during the flow of fluid through such receptacle; means for heating liquid so withdrawn; and means for delivering such liquid to said spray nozzle after it has been heated.

3. A method of removing condensable vapors and foreign material from compressed air, which consists in creating a confined flow of such air while maintaining the pressure thereof above atmospheric pressure; subjecting such air during such flow to the separate procedural steps including filtering and reduction in temperature to about but not below 32° F.; removing from the path of such flow of such air, the condensate resulting from such temperature reduction; while continuing such flow and such pressure, reducing the temperature of such air below 32° F. by intimately intermingling the same with a mass of refrigerated liquid maintained at a temperature below 32° F. but above the freezing temperature of such liquid; causing the air to move out of contact with such liquid and removing therefrom refrigerated liquid entrained thereby; substantially continuously withdrawing refrigerated liquid from the path of such air flow; heating the liquid so withdrawn to a temperature sufficient to remove therefrom condensate absorbed thereby during the intermingling with such air flow; while continuing the confined flow of such air subjecting withdrawn and heated liquid to the cooling effect of refrigerated air which has moved out of contact with such refrigerating liquid; delivering the liquid so cooled into the path of flow of initially cooled air; delivering the same with initially cooled air into said mass of refrigerated liquid; and subjecting the same to refrigeration to reduce the temperature thereof below 32° F. but above the freezing temperature of such liquid.

4. A method of removing condensable vapors and foreign particles from a compressed fluid existing above atmospheric pressure; which consists in creating a confined flow of such fluid while maintaining the pressure thereof above atmospheric pressure; initially cooling such fluid to reduce the dew point thereof; removing from the path of such flow, condensate resulting from such cooling; while maintaining such flow of the initially cooled fluid, causing the same to move in a finely divided state into and through a body of refrigerated liquid maintained at a temperature below 32° F. but above the freezing temperature of such liquid; while continuing the flow of such fluid and the intermingling thereof with liquid of such body, withdrawing liquid from said body and heating the same to remove therefrom condensate absorbed thereby from such fluid; causing a heat interchange between the withdrawn and heated liquid and fluid leaving said body of liquid, to partially cool such withdrawn and heated liquid and to increase the temperature of such fluid; then causing a heat interchange between initially cooled fluid entering said body of refrigerated liquid and said partially cooled heated liquid and delivering such withdrawn liquid and fluid heated thereby to said body of refrigerated liquid and causing the fluid so delivered to move through said body in a finely divided state.

5. A method of removing condensable vapors from compressed air, which consists in confining a flow of such air while maintaining the pressure thereof above atmospheric pressure; initially cooling the compressed and confined air during such flow to reduce the dew point thereof; removing from the path of such flow condensate resulting from the reduction in temperature of such air; delivering the initially cooling air into a mass of refrigerated liquid maintained at a temperature below 32° F. but above the freezing temperature of such liquid; causing the air so delivered to intimately intermingle with liquid of such mass; during such intermingling withdrawing liquid from such mass; heating liquid so withdrawn to remove therefrom condensate absorbed thereby from such air; causing the air delivered to said mass of refrigerated liquid to move out of contact therewith and to move into heat interchange relationship with the heated liquid withdrawn from said mass, to partially cool such liquid; spraying the thus partially cooled liquid into the path of flow of initially cooled air moving toward said mass of refrigerated liquid; delivering such initially cooled air and the sprayed liquid into said mass of refrigerated liquid; refrigerating the liquid so delivered and the mass of such liquid to maintain the temperature thereof below 32° F. but above the freezing point of such liquid; and utilizing refrigerated air employed in such heat interchange relationship with said withdrawn and heated liquid, to initially cool compressed air confined and flowing toward said mass of refrigerated liquid.

6. A method of removing readily condensable vapors from a compressed fluid such as compressed air, which consists in confining a flow of such fluid while maintaining the pressure thereof above atmospheric pressure; delivering such flow of confined fluid to a body of refrigerated liquid maintained at a temperature below 32° F. but above the freezing temperature of such liquid; causing the fluid so delivered to bubble through such body of liquid; collecting such fluid issuing from such body of liquid at a point above such body; while continuing the flow of such fluid so collected and while maintaining the pressure thereof above atmospheric pressure, separating therefrom the refrigerated liquid entrained thereby; withdrawing liquid from said body of liquid during the bubbling of fluid therethrough; heating the liquid so withdrawn to remove therefrom vapors absorbed thereby as the result of the bubbling of fluid through such body of liquid; partially cooling the withdrawn and heated liquid by subjecting the same to a flow of fluid which has issued from said body of liquid; spraying the partially cooled liquid into the flow of fluid moving toward such body of liquid; then delivering liquid so sprayed into such body of liquid with the flow of fluid entering such body; and refrigerating the liquid so delivered and the liquid of said body to continuously maintain the temperature of such body of liquid below 32° F. but above the freezing point of such liquid.

7. A method of removing readily condensable vapors from a compressed fluid such as compressed air, which consists in confining a flow of such fluid while maintaining the pressure thereof above atmospheric pressure; initially cooling such fluid to materially reduce the dew point thereof while maintaining the temperature thereof above 32° F. and while maintaining the flow thereof and the pressure thereof above atmospheric pressure; removing resulting condensate from the path of such flow; delivering the flow of initially cooled fluid to a column of refrigerated liquid maintained at a temperature below 32° F. but above the freezing temperature of such liquid; causing the fluid so delivered to bubble through such column of liquid from a point adjacent the bottom thereof; collecting fluid issuing from the surface of said column at a point above such surface; continuing the flow of the fluid so collected while maintaining the pressure thereof above atmospheric pressure; during such continued flow, separating from such fluid refrigerated liquid collected thereby; withdrawing refrigerated liquid from a region intermediate the length of such column; heating liquid so withdrawn to remove therefrom vapors absorbed thereby as the result of the bubbling of fluid through such column; partially cooling the withdrawn and heated liquid by causing a heating interchange between the same and fluid which has passed through said column of liquid; spraying the liquid thus partially cooled into the flow of initially cooled liquid moving toward said column; delivering liquid so sprayed into the column of liquid with the fluid entering such column; refrigerating the liquid so delivered and the liquid of such column to maintain the temperature thereof below 32° F. but above the freezing temperature of such liquid; and employing at least a portion of the fluid which has passed through said column of liquid in initially cooling the confined and compressed fluid prior to the delivery thereof to such column of liquid.

8. A system for removing readily condensable vapors from compressed air, which consists in the combination of means for confining a flow of such air while maintaining the pressure thereof above atmospheric pressure; a refrigerating device located in the path of such flow for initially cooling such air; means within the path of such flow for removing from such path condensate resulting from the initial cooling of such air; a liquid-containing receptacle; refrigerating means located within said receptacle for maintaining the temperature of the liquid contained therein below 32° F. but above the freezing temperature of such liquid; a bubbler located within the body of the liquid contained in said receptacle; means for delivering initially cooled air to said bubbler and through the same into the liquid within said receptacle; a liquid cooler located in said receptacle above said bubbler; means for withdrawing liquid from said receptacle during the delivery of air thereto; means for heating the liquid so withdrawn; a liquid cooler; means for delivering liquid from said heater to said cooler; means for delivering air from said receptacle to said cooler in heat interchange relationship with liquid delivered to said cooler; a liquid spray device located within said bubbler and a pump for delivering liquid from said cooler to said spray device and an air delivery passage for receiving air from said cooler.

References Cited in the file of this patent

UNITED STATES PATENTS

| | | |
|---|---|---|
| 1,791,086 | Sperr, Jr. | Feb. 3, 1931 |
| 1,905,068 | Sperr, Jr. | Apr. 25, 1933 |
| 2,114,787 | Smith | Apr. 19, 1938 |
| 2,151,248 | Vaughan | Mar. 21, 1939 |
| 2,235,322 | Martin | Mar. 18, 1941 |
| 2,276,970 | Hibberd | Mar. 17, 1942 |
| 2,306,553 | Miller | Dec. 29, 1942 |
| 2,367,695 | Spiselman | Jan. 23, 1945 |
| 2,428,643 | Young | Oct. 7, 1947 |

OTHER REFERENCES

"Pressure Maintenance" by R. A. Carter, Oil Weekly, July 21, 1941, pages 29 to 33.